United States Patent
Barba et al.

(10) Patent No.: US 7,181,335 B2
(45) Date of Patent: Feb. 20, 2007

(54) METHOD FOR DETERMINING A CHANGE IN AIR CONSUMPTION FOR A COMBUSTION ENGINE

(75) Inventors: Christian Barba, Fellbach (DE); Martin Dietz, Stuttgart (DE); Guenter Moll, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/527,439

(22) PCT Filed: Aug. 26, 2003

(86) PCT No.: PCT/EP03/09415

§ 371 (c)(1),
(2), (4) Date: Feb. 28, 2006

(87) PCT Pub. No.: WO2004/033881

PCT Pub. Date: Apr. 22, 2004

(65) Prior Publication Data

US 2006/0161332 A1 Jul. 20, 2006

(30) Foreign Application Priority Data

Sep. 12, 2002 (DE) .................. 102 42 233

(51) Int. Cl.
  F02D 41/00 (2006.01)
  G01M 15/05 (2006.01)
  F02M 25/07 (2006.01)
(52) U.S. Cl. .................. 701/108; 73/117.3; 701/114

(58) Field of Classification Search ................ 701/108, 701/109, 110, 114; 123/480, 436, 687, 568.21, 123/568.22; 73/117.3
See application file for complete search history.

(56) References Cited

U.S. PATENT DOCUMENTS

| | | | |
|---|---|---|---|
| 4,565,166 A | 1/1986 | Takeda | |
| 5,065,717 A | 11/1991 | Hosokai et al. | |
| 5,520,153 A | 5/1996 | Milunas | |
| 5,590,632 A | 1/1997 | Kato et al. | |
| 6,009,862 A | 1/2000 | Wanat et al. | |
| 6,170,469 B1 | 1/2001 | Itoyama et al. | |
| 6,234,139 B1 * | 5/2001 | Taga et al. | .................. 123/295 |
| 6,334,425 B1 | 1/2002 | Nagatani et al. | |

(Continued)

FOREIGN PATENT DOCUMENTS

DE  40 41 875 A1  12/1990

(Continued)

*Primary Examiner*—Willis R. Wolfe, Jr.
*Assistant Examiner*—Johnny H. Hoang
(74) *Attorney, Agent, or Firm*—Crowell & Moring LLP

(57) ABSTRACT

In a method for determination of a change in volumetric efficiency for an internal combustion engine, a reference volumetric efficiency is determined in advance. A first actual volumetric efficiency value which corresponds to a sensor error, is then determined at a first measurement point in a first rotational speed range in which a change in the flow losses in an intake tract has only a minor effect on the volumetric efficiency. A second actual volumetric efficiency value is determined at a second measurement point in a second rotational speed range that is greater than the first rotational speed range. The second actual volumetric efficiency value is corrected by means of the first actual volumetric efficiency value, and the change in volumetric efficiency is determined from the reference volumetric efficiency and the corrected second actual volumetric efficiency.

9 Claims, 2 Drawing Sheets

U.S. PATENT DOCUMENTS 6,463,912 B1 * 10/2002 Fuwa ........................ 123/480
6,837,227 B2 * 1/2005 Jaliwala et al. ........ 123/568.21

FOREIGN PATENT DOCUMENTS

| DE | 195 08 505 C2 | 3/1995 |
| DE | 199 34 508 A1 | 7/1999 |
| DE | 100 20 341 A1 | 4/2000 |
| JP | 2000-220532 | 8/2000 |

* cited by examiner

METHOD FOR DETERMINING A CHANGE IN AIR CONSUMPTION FOR A COMBUSTION ENGINE

BACKGROUND AND SUMMARY OF THE INVENTION

This application claims the priority of German patent document 102 42 233.8, filed Sep. 12, 2002 (PCT International Application No. PCT/EP2003/009415), the disclosure of which is expressly incorporated by reference herein.

This invention relates to a method for determining a change in volumetric efficiency for an internal combustion engine.

German Patent Document DE 199 34 508 A1 describes a method for controlling exhaust gas recirculation in which a setpoint exhaust gas recirculation quantity is determined based on engine load, engine torque and atmospheric pressure. An actual exhaust gas recirculation quantity and the opening and closing movements of a throttle valve are detected by sensors; and an exhaust gas recirculation control valve is operated as a function of the difference between the actual and setpoint exhaust gas recirculation quantity and a throttle valve opening signal as well as a throttle valve closing signal and the respective air pressure. The determination of the exhaust gas recirculation quantity by sensors is performed by differential pressure measurement by means of a differential pressure sensor at a throttle opening provided in a respective exhaust gas recirculation line.

For exhaust gas recirculation regulation and/or control, it is necessary to know the actual exhaust gas recirculation quantity at every point in time, if possible, and/or the engine operating state. This is particularly important with varying temperature and varying ambient air pressure from the environment from which the fresh gas (i.e., fresh air for the internal combustion engine) is usually obtained. If the actual exhaust gas recirculation quantity is known, the exhaust gas recirculation rate and/or the setpoint exhaust gas recirculation quantity may be regulated at a suitable setpoint exhaust gas recirculation quantity i.e., rate.

The fresh gas quantity fed into the combustion chamber(s) of the internal combustion engine can be measured by a hot-film air-mass flow meter or sensor (HFM) in a fresh gas intake manifold and/or intake path. The total quantity of gas mixture fed into the combustion chamber(s) of the internal combustion engine during engine operation can be determined based on a reference gas mixture quantity determined in advance on a test stand, for example and/or based on a corresponding characteristic line and/or a corresponding engine characteristic map, taking account the prevailing pressure and the prevailing temperature in the intake path. Alternatively, the quantity of gas mixture may also be calculated from the volumetric efficiency by using the ideal gas equation. The actual gas recirculation quantity can be determined by forming the difference between the total quantity of gas mixture fed into the internal combustion engine and the quantity of fresh gas. This actual exhaust gas recirculation quantity can be regulated at a setpoint exhaust gas recirculation quantity by means of an exhaust gas recirculation regulating and/or control system.

Volumetric efficiency is a measure of the fresh gaseous charge; that is, the gas quantity supplied to the internal combustion engine. It is defined as the ratio of the charge feed (i.e., the quantity of gas supplied) to the theoretical charge and/or the quantity of gas theoretically feedable per operating cycle. Volumetric efficiency is thus the ratio of the total fresh charge supplied per operating cycle to the fresh charge in filling the geometric cubic capacity of the internal combustion engine with air and/or a mixture in the ambient state, with the engine not supercharged and/or in the state downstream from a compressor and/or turbocharger or a charging air cooler in internal combustion engines with supercharging. For operation with exhaust gas recirculation, the volumetric efficiency is defined as the ratio of the total quantity of gas mixture supplied per operating cycle to the quantity of gas mixture in filling the geometric cubic capacity of the internal combustion engine with gas mixture in the state after admixture through the exhaust gas recirculation.

The term "quantity" is used in the present case for the sake of simplicity to include a physical parameter indicative of quantity such as that used for the mass or the quantity- or flow rate of recirculated exhaust gas, gas mixture or fresh gas supplied to the internal combustion engine. Volumetric efficiency is also defined as the absorption capacity of an engine.

Since the volumetric efficiency of the internal combustion engine is determined for measured values and/or by appropriate sensors, a change in volumetric efficiency can be attributed to a physical change and/or a false sensor signal. For example, if the reference level of a measurement (i.e., the zero point) and/or a characteristic line of a sensor and/or a measurement instrument changes over a longer period of time, without any apparent external influences, this is referred to as drift and/or a drifting sensor signal. A drifting sensor signal may be incorrectly interpreted as a change in volumetric efficiency due to physical causes.

One object of the present invention is to provide a method of the most accurate possible determination of a change in volumetric efficiency.

Another object of the invention is to provide an application of the inventive method for determining the exhaust gas recirculation quantity for an internal combustion engine having exhaust gas recirculation.

These and other objects and advantages are achieved by the method according to the invention, in which a reference volumetric efficiency is determined in advance. In addition, a first prevailing volumetric efficiency is determined from a first measured value and a second prevailing volumetric efficiency is determined from a second measured value. According to the invention, the first measured value is determined at a rotational speed at which a change in the flow losses in the intake path has only a minor effect on the volumetric efficiency. Consequently the recognized deviation from the reference volumetric efficiency in the first measured value corresponds mainly to a sensor error and/or an incorrectly detected signal. The second measured value is determined at a rotational speed which is above the rotational speed for the first measured value and at which a change in the flow losses also has an effect on the volumetric efficiency. The recognized deviation from the reference volumetric efficiency of the second measured value thus includes a physical change as well as a change caused by a sensor error.

A first and a second prevailing volumetric efficiency are determined from the measured values. According to the invention, the second prevailing volumetric efficiency is corrected by means of the first prevailing volumetric efficiency because this may include a sensor error, which is given as its deviation from the reference volumetric efficiency. It is now possible to determine the physical change in volumetric efficiency for this second prevailing volumetric efficiency, now corrected, and the reference volumetric efficiency.

The inventive method according to the invention may be implemented to advantage in a conventional control unit for in an internal combustion engine, e.g., in a motor vehicle. A higher precision of the calculated volumetric efficiency and/or the calculated change in volumetric efficiency can be achieved through the processing of the sensor signals, thereby permitting a more accurate and thus improved regulation/control of the exhaust gas recirculation quantity and the exhaust gas recirculation rate. Since sensor errors can be detected and taken into account, it is possible to use less expensive sensors and/or meters.

Other objects, advantages and novel features of the present invention will become apparent from the following detailed description of the invention when considered in conjunction with the accompanying drawings.

DETAILED DESCRIPTION OF THE DRAWINGS

Figure 1:
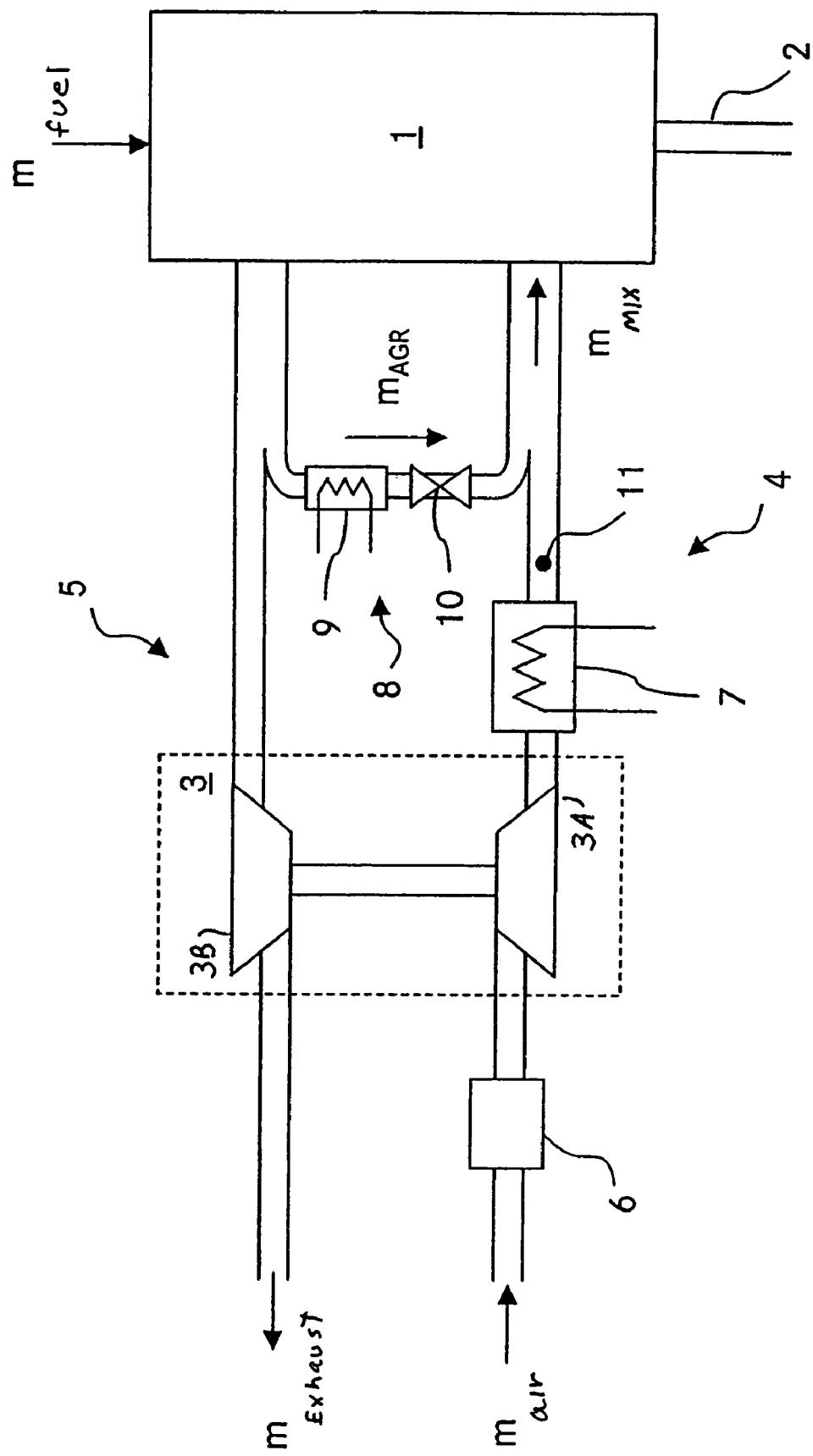
FIG. 1 is a schematic diagram of an internal combustion engine having an intake path and an exhaust path.

FIG. 1 shows an internal combustion engine 1 having an intake path 4 for fresh gas and/or for air, an exhaust path 5 and an exhaust gas recirculation 8 in which the exhaust gas recirculation rate/quantity is to be regulated and/or controlled. The actual exhaust gas recirculation quantity can be detected on the basis of a determination of a change in volumetric efficiency. A precise determination of the change in volumetric efficiency is thus possible. The inventive method is preferably used for determining the change in volumetric efficiency.

The internal combustion engine 1 is coupled to a drive shaft 2 for the standard drive wheels on a motor vehicle. An exhaust gas turbocharger 3 is preferably provided in the intake path 4 and in the exhaust path 5. A compressor 3A of the exhaust gas turbocharger 3 is provided in the intake path 4 and an exhaust turbine 3B provided in the exhaust gas path 5. Downstream from the compressor 3A, a charging air cooler 7 is preferably provided in the intake path 4. The exhaust path 5 is connected to the intake path 4 downstream from the charging air cooler 9 via an exhaust gas recirculation system 8. Another cooler 9 and an exhaust gas recirculation valve 10 are preferably provided in the exhaust gas recirculation system 8. The exhaust gas recirculation valve 10 is preferably situated in the exhaust gas recirculation 8 downstream from the cooler 9.

A gas mixture quantity $m_{mix}$ and a fuel quantity $m_{fuel}$ are supplied to the internal combustion engine. The quantity of gas mixture $m_{mix}$ is composed of a fresh gas quantity and/or an air quantity $m_{air}$ and a recirculated exhaust gas quantity $m_{AGR}$. The remaining exhaust gas quantity $m_{exhaust}$ is supplied to an exhaust system (not shown) via the exhaust gas turbine 3B of the exhaust gas turbocharger 3.

The fresh gas quantity $m_{air}$ is measured by a sensor 6, preferably a hot-film air-mass-flow sensor (HFM) situated upstream from the compressor of the exhaust gas turbocharger 3 in the intake path 4. Preferably another measurement point 11 is situated downstream from the charging air cooler 7 in the intake path 4 so that the temperature and pressure of the fresh gas can be determined at this measurement point via corresponding sensors (not shown).

With the exhaust gas stirring recirculation closed the volumetric efficiency η is obtained by calculation using the ideal gas equation based on the measurement point 11 as follows:

$$\eta = \frac{m_{air} \cdot T \cdot R}{p \cdot V_h}$$

wherein the fresh gas quantity $m_{air}$ is known via the sensor 6, and the temperature T and the pressure p are known via other sensors (not shown) at the measurement point 11; R is the individual gas constant and $V_h$ is the engine displacement. The above equation is also known as the volumetric efficiency equation.

According to the invention, a reference volumetric efficiency is determined in advance. This reference volumetric efficiency may be, for example, a description of the volumetric efficiency of a reference engine, in the form of a characteristic line, an engine characteristic map and/or a simulation model, which depends on a rotational speed and a load (preferably determined by an injection quantity). The reference volumetric efficiency is preferably determined experimentally and/or on an engine test stand before installing an internal combustion engine at its point of use (in particular in a motor vehicle). In determining the reference volumetric efficiency, the exhaust gas recirculation 8 is deactivated and the gas mixture quantity $m_{mix}$ corresponds to the fresh gas quantity $m_{air}$ fed into the engine.

With method according to the invention, a change in volumetric efficiency in comparison with the reference volumetric efficiency can be determined as a function of the individual internal combustion engine and running time. This determination of the change in volumetric efficiency is performed on the basis of any number of adaptive points and/or measurement points. At these measurement points, measured values (in particular the fresh gas mass $m_{air}$), are determined, and a prevailing volumetric efficiency is determined from each. The internal combustion engine is operated with deactivated exhaust gas recirculation and preferably in a steady state at a measurement point.

In order to differentiate whether the change in volumetric efficiency determined on the basis of the above equation is due to physical causes or a sensor error, the sensor error is determined in another process step. The following principle which is based on the Bernoulli equation shows the physical relationships in flow losses in a flow tube such as the intake path 4:

$$\Delta p = C \cdot \frac{\rho}{2} \cdot v^2$$

wherein the change in the dynamic pressure and/or stagnation pressure Δp is proportional to a change in the volumetric efficiency Δη and a velocity v of the fresh gas quantity is proportional to a rotational speed n of the internal combustion engine. The constant C is a dimensionless resistance coefficient. The value ρ stands for the density of the fresh gas in the intake path 4. The flow losses and/or the pressure drop caused thereby are proportional to the square of the engine rotational speed n according to the above equation (also known as the flow loss equation). Since the flow losses are also proportional to the change in volumetric efficiency, it follows that the change in volumetric efficiency is also proportional to the square of the engine rotational speed n.

In a first rotational speed range with low engine rotational speeds n, changes in the flow losses thus have only a minor effect on the volumetric efficiency. Therefore, a volumetric efficiency that is determined for a rotational speed n in the first rotational speed range and deviates from the reference volumetric efficiency can be attributable only to a sensor error, because according to the prevailing laws of physics (see the flow loss equation) there should be only a negligible change in volumetric efficiency or none at all. Since the sensor error is now known, it can be taken into account in the determination of changes in volumetric efficiency at higher rotational speeds.

In method according to the invention, the entire rotational speed range of the internal combustion engine is divided into first and second rotational speed ranges. For the first rotational speed range, it is assumed that a change in the flow losses in the intake path 4 will at most have only a minor effect on the volumetric efficiency. The second rotational speed range is greater than the first in terms of rotational speed. A first measured value is determined at a first measurement point, corresponding to a first rotational speed in the first rotational speed range and a first fuel quantity and/or a first torque. This measured value is the prevailing fresh gas quantity $m_{air}$ from which a first prevailing volumetric efficiency is calculated by means of a currently measured temperature and a currently measured pressure, e.g., at a measurement point 11 in FIG. 1.

Figure 2:
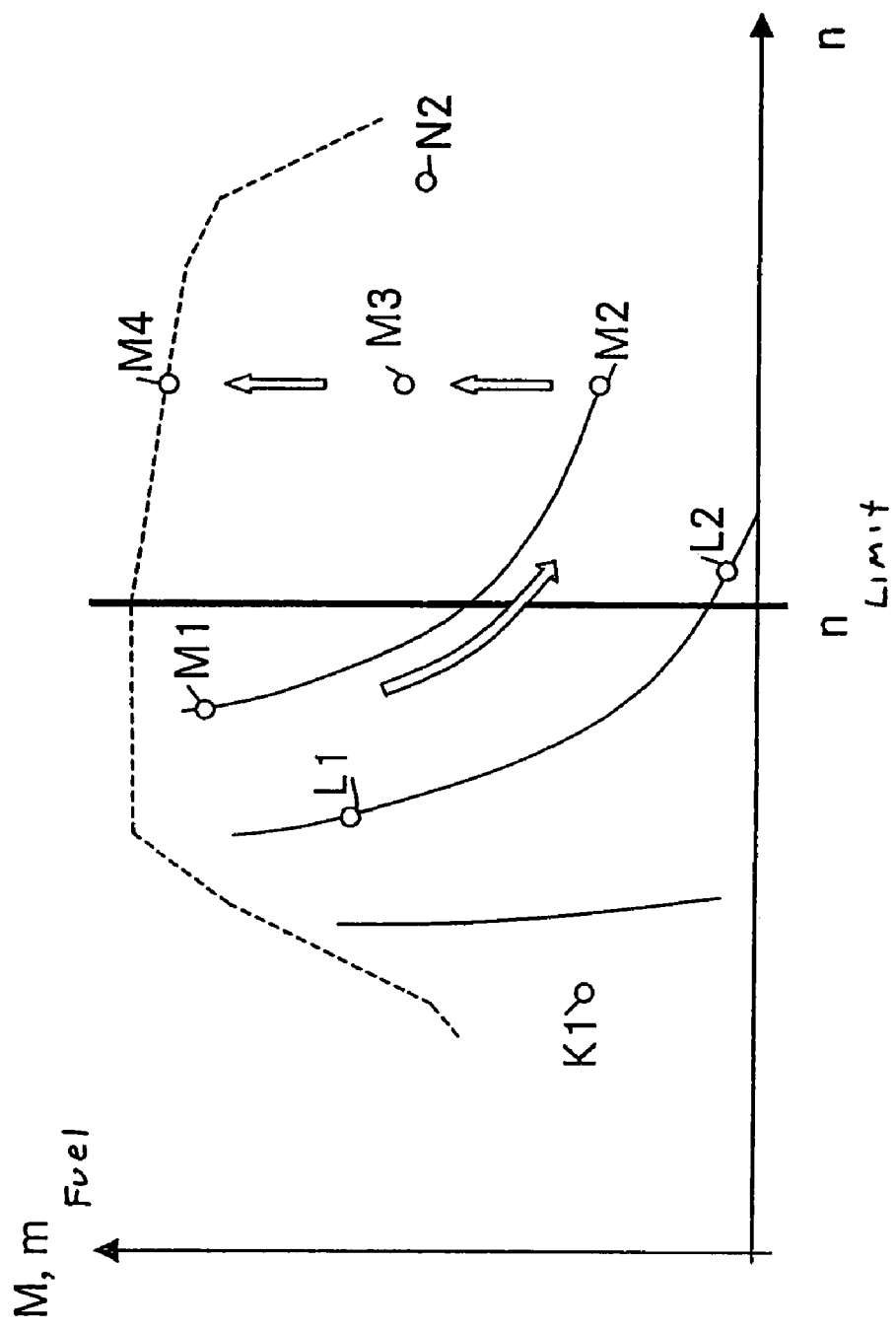
FIG. 2 is a graphic plot of a determination of measurement points for detecting a change in volumetric resistance.

FIG. 2 shows a graphic plot of a determination of measurement points for detecting a change in volumetric efficiency in the form of an engine characteristic map plotted as a function of rotational speed n and torque M and/or fuel quantity $m_{fuel}$. A limiting rotational speed $n_{limit}$ marks the transition from the first rotational speed range to the second rotational speed range by means of a line shown in bold running parallel to the ordinate. The dotted line in FIG. 2 is a full-load curve. At the first measurement points starting from which the first prevailing volumetric efficiency is determined, may be the measurement point M1, for example, but may also be the measurement point L1. If the volumetric efficiency determined on the basis of these measurement points has changed in comparison with the reference volumetric efficiency, this change is classified as a change caused by a sensor error.

In another process step, a second measured value is determined at a second measurement point M2 and/or L2 in the second rotational speed range. From the second measured value, a second prevailing volumetric efficiency is determined, taking into account a prevailing fresh gas mixture quantity $m_{air}$, a prevailing temperature and a prevailing pressure. A change in the second prevailing volumetric efficiency in comparison with the reference volumetric efficiency can be separated in this rotational speed range into a physical component and a component due to sensor error, because the component due to a sensor error is already known from the first measurement point M1 and/or L1 and the respective first prevailing volumetric efficiency. The second prevailing volumetric efficiency is corrected by taking into account the first prevailing volumetric efficiency thus determined. The second prevailing volumetric efficiency is thus corrected to account for the measurement error (i.e., sensor error), and the change in volumetric efficiency is determined from the reference volumetric efficiency and the second prevailing volumetric efficiency (now corrected).

The second measured value for the second prevailing volumetric efficiency is preferably obtained at a second measurement point at which the fresh gas quantity $m_{air}$ corresponds to the fresh gas quantity at the first measurement point. With reference to FIG. 2, the measurement points M1 and M2 and/or L1 and L2 lie on a line of equal fresh gas quantities and/or air mass per pair of measurement points, characterized by the solid lines with a negative slope. (These lines may also be referred to as isolines.) To arrive at the second measurement point M2 from the first measurement point M1, for example, one might imagine moving along the isoline of the same air mass $m_{air}$ assigned to this measurement point. On the basis of the existing description of the reference volumetric efficiency (e.g., in the form of an engine characteristic map), any other measurement points M3 and M4 may now be used at the same rotational speed as at the measurement point M2, starting from which corresponding changes in volumetric efficiency can be determined and by which they can be corrected to eliminate the sensor error known from the measurement point M1 because it is possible to differentiate between sensor error and/or sensor deviation and change in volumetric efficiency. Starting from the prevailing volumetric efficiency at measurement point M2 it is possible to directly deduce the prevailing volumetric efficiency at measurement point M3 and/or M4. This follows in particular from the fact that the load dependence of the volumetric efficiency is maintained. (That is, it can be derived from the reference engine characteristic map and depends at most on the running time and type of engine.) The sensor error and/or measurement error (namely the error determined at the measurement point M1) can be taken into account to advantage in the determination of the volumetric efficiency corresponding to the measurement point M4. This can also be done at a measurement point M4 to which no first measurement point in the first rotational speed range can be assigned for determination of the sensor error, this point being on an isoline with the same fresh gas quantity $m_{air}$ as the measurement point M4.

The measurement points can advantageously be approached in any order, and any number of measurement points is conceivable. For determination of a change in volumetric efficiency at measurement points between individual measurement points for which measured values have already been determined, the corresponding measured values can be determined by interpolation. Measurement points K1 in the first rotational speed range that do not have a second measurement point on a common iso characteristic line of the same air mass $m_{air}$ in the second rotational speed range are preferably likewise taken into account in an interpolation calculation, because no physical value of a change in volumetric efficiency is to be expected at the measurement point K1.

A measurement point N2, which is in the second rotational speed range and to which no corresponding measurement point that is on a common isoline with the same air mass $m_{air}$ with the second measurement point N2 can be assigned in the first rotational speed ranges is preferably also taken into account in the interpolation and/or extrapolation calculations. This may take place because with a suitable choice of measurement points in the second rotational speed range which are each on common isolines with measurement points of the first rotational speed range, there are enough interpolation points for the calculation of a sensor error at a measurement point N2. Therefore, any sensor errors can also be taken into account in the case of a change in volumetric efficiency corresponding to the measurement point N2. With the measurement point M4, a sensor error is known at a high fresh air mass flow thus permitting calculation, in particular an extrapolation calculation, of the sensor error at a measurement point N2 in good approximation. Advantageously the determination of the change in volumetric resistance due to physical causes can also be performed in higher rotational speed ranges in this way.

Operating conditions or ambient conditions (such as altitude and ambient pressure) are preferably taken into account in the determination of the change in volumetric efficiency. This can be achieved by adapting the description of the reference volumetric efficiency (preferably an engine characteristic map) to the altered conditions as a function of the operating conditions and/or ambient conditions. An adaptation may take place among other things by the fact that different reference volumetric efficiency descriptions are entered into a control unit for different operating and/or ambient conditions, and it is possible to switch back and forth between these descriptions and/or perform a sliding interpolation between them as a function of the operating conditions and/or ambient conditions.

Alternatively, the assignment of the measurement points M1 and M2 and/or L1 and L2 described here with preferably the same air mass under varying operating and/or ambient conditions, e.g., at varying altitudes, may take place in such a way that the position of the respective measurement point M2 and/or L2 is shifted with respect to the fuel quantity $m_{fuel}$ and/or torque M via a correction function which preferably depends on the ambient pressure.

The method according to the invention may be used to determine an exhaust gas recirculation quantity for an internal combustion engine having exhaust gas recirculation. An updated reference volumetric efficiency can be determined from an original reference volumetric efficiency and the change in volumetric efficiency determined by means of the inventive method. Then in turn a reference gas quantity can be determined from the updated reference volumetric efficiency. The reference gas quantity may then be used to determine a prevailing gas mixture quantity fed into the engine by means of a prevailing gas mixture temperature and a prevailing gas mixture pressure, which can be determined by appropriate measurements and/or calculations. The prevailing exhaust gas recirculation quantity can then be determined on the basis of the difference between the prevailing gas mixture quantity and a measured fresh gas fraction of the prevailing gas mixture.

Alternatively or additionally, the prevailing gas mixture quantity may also be determined from a prevailing volumetric efficiency, the prevailing pressure and the prevailing temperature of the gas mixture. The prevailing volumetric efficiency is determined here on the basis of the prevailing change in volumetric efficiency determined by the method according to the invention, and on the basis of a reference volumetric efficiency which is entered into a control unit in the form of an engine characteristic map, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining a change in volumetric efficiency for an internal combustion engine, comprising:
   first, determining a reference volumetric efficiency;
   thereafter determining a first actual volumetric efficiency value from a first measured value at a first measurement point in a first rotational speed range in which a change in the flow losses in an intake tract has only a minor effect on the volumetric efficiency;
   determining a second actual volumetric efficiency value from a second measured value at a second measurement point in a second rotational speed range which is greater than the first rotational speed range in terms of rotational speed;
   correcting the second actual volumetric efficiency value based on first actual volumetric efficiency value; and
   determining change in volumetric efficiency based on the reference volumetric efficiency and the corrected second actual volumetric efficiency value.

2. The method as claimed in claim 1, wherein the second measured value is determined at the same fresh gas quantity as the first measured value.

3. The method as claimed in claim 1, wherein the internal combustion engine is in a steady state when a measured value is determined.

4. The method as claimed in claim 1, wherein exhaust gas recirculation is deactivated before determining a measured value.

5. The method as claimed in claim 1, wherein actual volumetric efficiency is calculated based on a measured actual pressure and actual temperature in the intake path.

6. The method as claimed in claim 1, wherein at least one of the volumetric efficiency and change in volumetric efficiency between two measurement points is determined by one of interpolation and extrapolation.

7. The method as claimed in claim 1, wherein at least one of operating conditions and ambient conditions is taken into account in determination of the measured values.

8. A method for determining a change in volumetric efficiency as claimed in claim 1, for determination of an exhaust gas recirculation quantity for an internal combustion engine having exhaust gas recirculation, whereby
   an updated reference volumetric efficiency is determined from an original reference volumetric efficiency and the change in volumetric efficiency, and a reference gas quantity is determined from the updated reference volumetric efficiency;
   a prevailing gas mixture quantity is determined from the reference gas quantity by means of a prevailing temperature and a prevailing pressure,
   a fresh gas fraction of the prevailing gas mixture is determined; and
   a prevailing exhaust gas recirculation quantity is determined on the basis of the difference between the prevailing gas mixture quantity and the fresh gas mixture fraction.

9. A method for determining a change in volumetric efficiency as claimed in claim 8 wherein:
   an actual volumetric efficiency value is determined from a reference volumetric efficiency and the change in volumetric efficiency;
   an actual gas measurement quantity is determined from the actual volumetric efficiency value, an actual pressure and an actual temperature;
   a fresh gas fraction of the actual gas mixture is determined; and
   an actual exhaust gas recirculation quantity is determined on the basis of the difference between the actual gas mixture quantity and the fresh gas fraction.

* * * * *